United States Patent
Zhang et al.

(10) Patent No.: US 10,554,774 B2
(45) Date of Patent: Feb. 4, 2020

(54) INFORMATION PUSHING METHOD AND APPARATUS

(71) Applicant: Tencent Technology (Shenzhen) Company Limited, Shenzhen (CN)

(72) Inventors: Cheng Zhang, Shenzhen (CN); Jiangong Zhang, Shenzhen (CN); Xiaomin Xu, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 224 days.

(21) Appl. No.: 15/705,088

(22) Filed: Sep. 14, 2017

(65) Prior Publication Data

US 2018/0007156 A1 Jan. 4, 2018

Related U.S. Application Data

(63) Continuation-in-part of application No. PCT/CN2016/102356, filed on Oct. 18, 2016.

(30) Foreign Application Priority Data

Nov. 25, 2015 (CN) .......................... 2015 1 0834440

(51) Int. Cl.
*H04L 29/08* (2006.01)
*H04L 29/06* (2006.01)

(52) U.S. Cl.
CPC .............. *H04L 67/26* (2013.01); *H04L 67/42* (2013.01)

(58) Field of Classification Search
CPC .... G06F 3/0483; G06F 3/0485; G06F 16/958; G06F 17/3089; G06F 17/30554; G06F 16/9535; G06F 16/9577; G06F 3/0482
See application file for complete search history.

(56) References Cited

U.S. PATENT DOCUMENTS 9,588,647 B1 * 3/2017 Lewis .................... G06F 3/0482
2007/0130589 A1 * 6/2007 Davis ...................... H04L 12/66
725/62

(Continued)

FOREIGN PATENT DOCUMENTS

CN 103200428 A 7/2013
CN 104301203 A 1/2015
(Continued)

OTHER PUBLICATIONS

Tencent Technology, ISRWO, PCT/CN2016/102356, Jan. 18, 2017, 5 pgs.

(Continued)

*Primary Examiner* — Hitesh Patel
*Assistant Examiner* — Eui H Kim
(74) *Attorney, Agent, or Firm* — Morgan, Lewis & Bockius LLP

(57) ABSTRACT

Embodiments of the present disclosure disclose an information pushing method performed at a computer server, the method comprising: receiving an information retrieving request sent by a client; in response to the information retrieving request, identifying an information list and a current retrieval position of the information list; retrieving, from the information list, multiple pieces of information starting from the current retrieval position in a cyclic manner; and pushing the multiple pieces of information to the client, wherein the multiple pieces of information is presented at the client in their retrieval order.

15 Claims, 8 Drawing Sheets

(56) References Cited

U.S. PATENT DOCUMENTS

| | | | |
|---|---|---|---|
| 2007/0140300 A1* | 6/2007 | Handekyn | H04L 29/06027 370/486 |
| 2012/0311453 A1 | 12/2012 | Reyna et al. | |
| 2013/0103550 A1* | 4/2013 | Nygaard | G06Q 30/00 705/27.1 |
| 2014/0282153 A1 | 9/2014 | Christiansen et al. | |
| 2014/0317142 A1* | 10/2014 | Naidu | G06F 16/951 707/780 |
| 2014/0344411 A1 | 11/2014 | Gailis et al. | |
| 2015/0355795 A1* | 12/2015 | Falkenburg | G06F 16/958 715/201 |
| 2017/0013037 A1* | 1/2017 | Cang | H04L 67/06 |

FOREIGN PATENT DOCUMENTS

| | | |
|---|---|---|
| CN | 104717302 A | 6/2015 |
| CN | 104751351 A | 7/2015 |
| JP | 2013131116 A | 7/2013 |
| JP | 2014522042 A | 8/2014 |

OTHER PUBLICATIONS

Tencent Technology, IPRP, PCT/CN2016/102356, May 29, 2018, 4 pgs.

\* cited by examiner

INFORMATION PUSHING METHOD AND APPARATUS

RELATED APPLICATIONS

This application is a continuation-in-part application of PCT/CN2016/102356, entitled "METHOD AND DEVICE FOR PUSHING INFORMATION" filed on Oct. 18, 2016, which claims priority to Chinese Patent Application No. 201510834440.1, filed with the State Intellectual Property Office of the People's Republic of China on Nov. 25, 2015, and entitled "INFORMATION PUSHING METHOD AND APPARATUS", both of which are incorporated herein by reference in their entirety.

FIELD OF THE TECHNOLOGY

Embodiments of the present disclosure relate to the field of computers, and specifically, to an information pushing method and apparatus.

BACKGROUND OF THE DISCLOSURE

To implement efficient information browsing, many clients provide hot topic information display areas. Specifically, displaying information arranged according to popularity to enable users to rapidly browse the hot topic information of the clients. Currently, methods frequently used for displaying hot topic information include the following two types:

1. calculating, according to publishing time of information on a client, a quantity of thumb-ups of the information, and a quantity of replies of the information, information popularity of the information, sequentially arranging the information on the client in real time according to the information popularity, and displaying the ranked information on the client; however, when this method is used, because some hot topic information is relatively published early, the information is tapped and browsed by more users, and there is an obvious space occupying effect; the hot topic information occupies the display area for a long time, and as a result, information published later cannot be displayed to users in time, leading to leakage of other hot topic information; and 2. independently displaying hottest information on the client, and tapping a "more" option to enable the users to autonomously obtain more hot topic information; however, when the method is used, if there are various kinds of hot topic information, users need to tap the "more" option many times, and have relatively bad experience; in addition, because the hot topic information changes in real time, when the users respectively tap and select the "more" option, browsed hot topic information may be repeatedly displayed after tapping is performed many times; consequently, user experience is affected.

That is, currently, in relevant technologies, although hot topic information changes in real time, hot topic information displayed on the client is relatively fixed; that is, hot topic information pushed to the client has relatively low flexibility, and cannot meet real browsing requirements of the users.

For the foregoing problems, currently, no effective solutions are provided.

SUMMARY

Embodiments of the present disclosure provide an information pushing information and apparatus, so as to resolve at least a technical problem that information pushed to clients has relatively flexibility in relevant technologies.

According to an aspect of the embodiments of the present disclosure, an information pushing method is provided, including: receiving an information retrieving request sent by a client; in response to the information retrieving request, identifying an information list and a current retrieval position of the information list; retrieving, from the information list, multiple pieces of information starting from the current retrieval position in a cyclic manner; and pushing the multiple pieces of information to the client, wherein the multiple pieces of information is presented at the client in their retrieval order.

According to another aspect of the embodiments of the present disclosure, a computer server comprises one or more processors, memory and one or more programs stored in the memory that, when being executed by the one or more processors, cause the computer to perform the aforementioned information pushing method.

According to yet another aspect of the embodiments of the present disclosure, a non-transitory computer readable storage medium stores one or more programs that, when executed by one or more processors of a computer server, cause the computer server to perform the aforementioned information pushing method.

In this embodiment of the present disclosure, after an information retrieving request sent by a client is received, multiple pieces of information are read from a current retrieval position in an information list, and the multiple pieces of read information is pushed to the client. The information in the information list and the current retrieval position are updated periodically, and an updating period of the information list is greater than an updating period of the current retrieval position. Therefore, before the multiple pieces of information for displaying is pushed to the client, information on different positions in different information lists are read by traversing, so as to push different information to the client, thereby improving a flexibility effect of pushing information to the client, avoiding always pushing information with relatively fixed content to the client, and resolving a problem of bad user experience due to that the client cannot flexibly display the information.

Further, by means of continuously changing the information that is pushed to the client and that is used for displaying, different users may obtain corresponding information therefrom, thereby meeting browsing requirements of different users, and improving information pushing correctness.

BRIEF DESCRIPTION OF THE DRAWINGS

Accompany drawings described herein are used for further understanding the present disclosure and are a part of this application. Exemplary embodiments and descriptions thereof of the present disclosure are used for explaining the present disclosure, and do not inappropriately limit the present disclosure. In the accompany drawings.

DESCRIPTION OF EMBODIMENTS

To make persons skilled in the art understand the solutions of the present disclosure better, the technical solutions in the embodiments of the present disclosure are clearly and completely described in the following with reference to the accompanying drawings in the embodiments of the present disclosure. Apparently, the described embodiments are merely a part rather than all of the embodiments of the present disclosure. All other embodiments obtained by persons of ordinary skill in the art based on the embodiments of the present disclosure without creative efforts shall fall within the protection scope of the present disclosure.

It should be noted that in the specification, claims, and accompanying drawings of the present disclosure, the term "first", "second", or the like is intended to distinguish between similar objects but does not necessarily indicate a specific order or sequence. It should be understood that the data termed in such a way are interchangeable in proper circumstances so that the embodiments of the present disclosure described herein can be implemented in other orders than the order illustrated or described herein. Moreover, the terms "include", "contain" and any other variants mean to cover the non-exclusive inclusion, for example, a process, method, system, product, or device that includes a list of operations or units is not necessarily limited to those units, but may include other units not expressly listed or inherent to such a process, method, system, product, or device.

Figure 1:
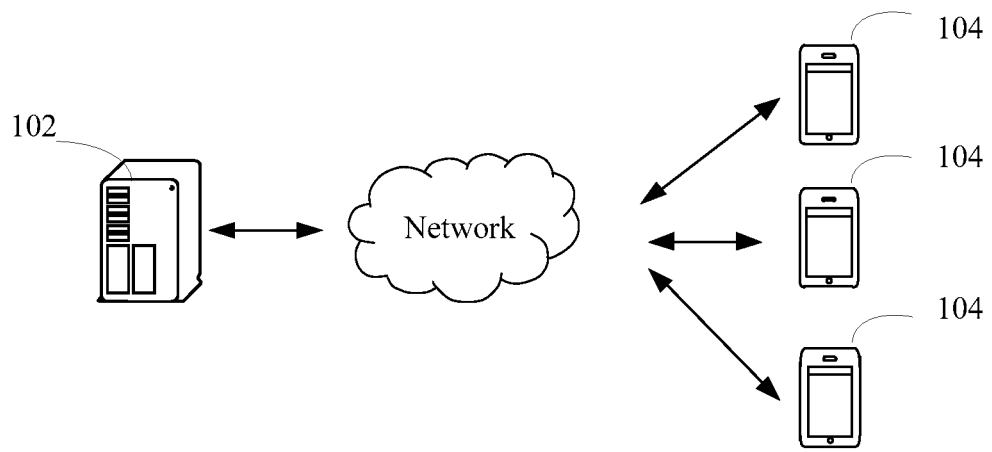
FIG. 1 is a schematic diagram of an application scenario of an information pushing method according to some embodiments of the present disclosure.

According to the embodiments of the present disclosure, an information pushing method is provided. The information pushing method may be applied to, but is not limited to, an application environment shown in FIG. 1. After receiving an information retrieving request sent by a client on a terminal 104 by using a network, a server 102 starts reading multiple pieces of information from a current retrieval position in an information list stored in the server 102 in response to the information retrieving request, and pushes the multiple pieces of information to the client on the terminal 104 by using the network, the information list updated according to a first time period, the current retrieval position updated according to a second time period, and the first time period being longer than the second time period. In some embodiments, the foregoing network may include but is not limited to: a wide area network, a metropolitan area network, or a local area network. In some embodiments, the foregoing terminal may include but is not limited to at least one of the following: a mobile phone, a tablet computer, a notebook computer, a PC computer, or a digital television. This is merely an example, and this embodiment is not limited thereto.

Figure 2:
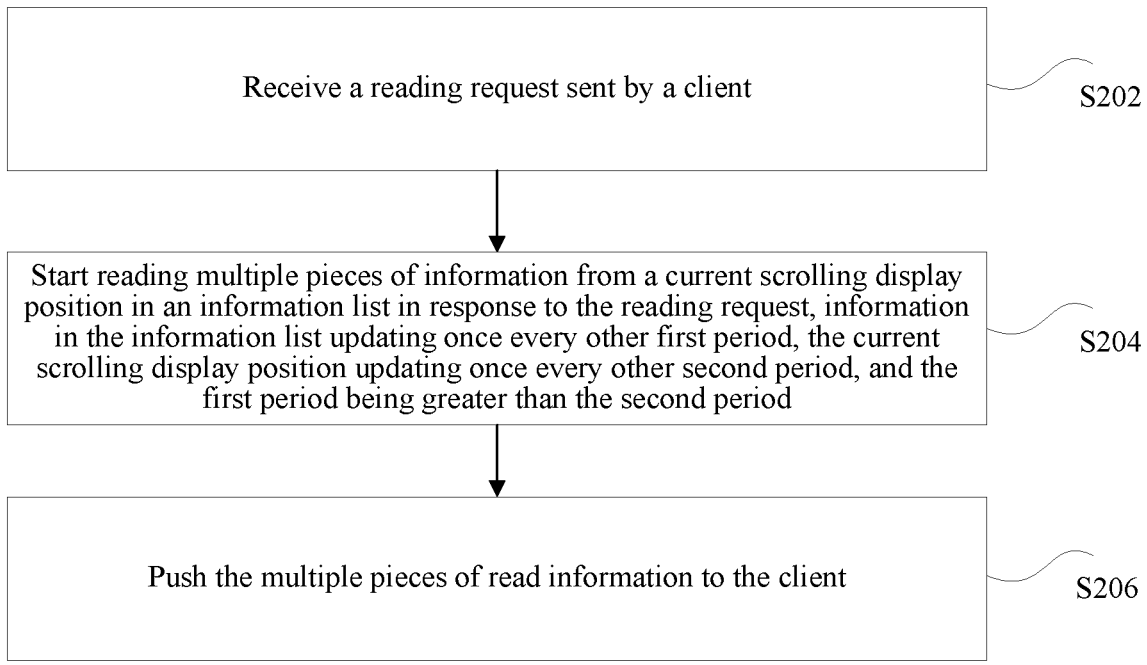
FIG. 2 is a flowchart of an information pushing method according to some embodiments of the present disclosure.

In this embodiment of the present disclosure, an information pushing method is performed at a computer server that is communicatively coupled to a client (e.g., a mobile terminal). As shown in FIG. 2, the method includes:

S202: Receive an information retrieving request sent by a client;

S204: Start reading multiple pieces of information from a current retrieval position in an information list in response to the information retrieving request, the information list updated according to a first time period, the current retrieval position updated according to a second time period, and the first time period being longer than the second time period; and S206: Push the multiple pieces of information to the client.

In some embodiments, the information pushing method may be applied to, but is not limited to, a process of presenting hot topic information. Specifically, after receiving the information retrieving request that is sent by the client and that is used for reading the hot topic information, the server starts reading multiple pieces of the hot topic information from the current retrieval position recorded in the information list, and further send the multiple pieces of hot topic information to the client for presentation. The hot topic information in the information list updates once according to the first time period, and the current retrieval position updates every other second time period, the first time period being longer than the second time period. This is merely an example, and this embodiment is not limited thereto.

In some embodiments, in response to the information retrieving request, the computer server first identifies an information list of hot topics and a current retrieval position of the information list. For example, the computer server may host a service of providing hot topic information for multiple users, each user having a user account identifier registered with the service. Based on the user's browsing activities, the computer server may establish a user profile for the user and use the user profile to generate a personalized list of hot topic information for the user. In addition, the computer server records a current retrieval position associated with the user account identifier. Whenever it receives a request for retrieving hot topic information, the computer server identifies the information list and the current retrieval position of the information list, both associated with the user account identifier, and then retrieves, from the information list, multiple pieces of information starting from the current retrieval position in a cyclic manner. For example, if the current retrieval position is 4 and the length of the information list is 10 and the computer server is going to retrieve 4 pieces of hot topic information from the information list, the computer server will retrieve nos. 4, 5, 6 and 7 from the information list. If the current retrieval position is 8 and the length of the information list is 10 and the computer server is going to retrieve 4 pieces of hot topic information from the information list, the computer server will retrieve nos. 8, 9, 10 and 1 from the information list, and so on so forth.

In some embodiments, the computer server updates the information list according to a first time period and the current retrieval position of the information list by a predefined interval in the cyclic manner according to a second time period. To make sure that the client is able to view the information list in its entirety, the first time period is set to be longer than the second time period such that, after updating the current retrieval position of the information list, the computer server retrieves, from the information list, multiple pieces of information starting from the updated current retrieval position in the cyclic manner and pushes the multiple pieces of information to the client. In other words, the computer server may periodically push an updated list of hot topic information items to the receiving client even if there is no subsequent request for more information.

In some embodiments, the update of the current retrieval position is independent from the update of the information list. In some other embodiments, the two updates are related such that the predefined interval is set to be a random number when the current retrieval position is updated for a first time immediately after the information list is updated and set to be a constant number after the first time. In other words, the current retrieval position is randomly set whenever there is a new information list to be pushed to the client.

It should be noted that in this embodiment, the hot topic information in the information list and the current retrieval position are periodically updated. Therefore, before information is pushed to the client, the hot topic information on different positions in different information lists are read, so as to improve flexibility for pushing information to the client, avoiding bad user experience due to that information with relatively fixed content is always pushed to the client, and the client cannot flexibly display the information.

In some embodiments, for the information list, information is sequentially obtained from a dynamic information list, and the dynamic information list changes in real time.

For example, the dynamic information list is a hot information ranking list, and ranks of hot information changes in real time. Therefore, the hot information ranking list also changes in real time. The hot information in the currently obtained hot information ranking list is used as an information snapshot (that is, the information list), and is recorded and stored. Carousel positions updating according to a predetermined period are set in the information snapshot so as to push different hot information in the information snapshot to the client according to indications of different positions, so as to flexibly push to-be-displayed hot information to the client.

In some embodiments, the foregoing information list may be, but is not limited to, a part of or all of the dynamic information list. That is, the information list may be the first N pieces of information in the currently obtained dynamic information list. For example, the first ten pieces of hot information is currently obtained from the hot information ranking list that dynamically changes in real time, and positions are set in an information list composed of the first ten pieces of hot information.

In some embodiments, the position of the information in the information list is determined according to a quantity of operation times of operations performed by the user on the information. In some embodiments, the position of the information in the information list is determined by using the following methods:

S1: Obtain the quantity of operation times of different operations performed by the user on the information; and S2: Determine the position of the information in the information list according to a weighted average of the quantity of operation times of different operations.

In some embodiments, the foregoing operations may include, but is not limited to, at least one of the following: liking, replying, or bumping.

In some embodiments, the current retrieval position may be, but is not limited to, obtained by moving by a same predetermined interval every other second time period.

It should be noted that the information list is an ordered sequence. The multiple pieces of information read by starting from the current retrieval position in the information list may be, but is not limited to, the multiple pieces of information by using information indicated by the current retrieval position as a starting point.

Figure 3:
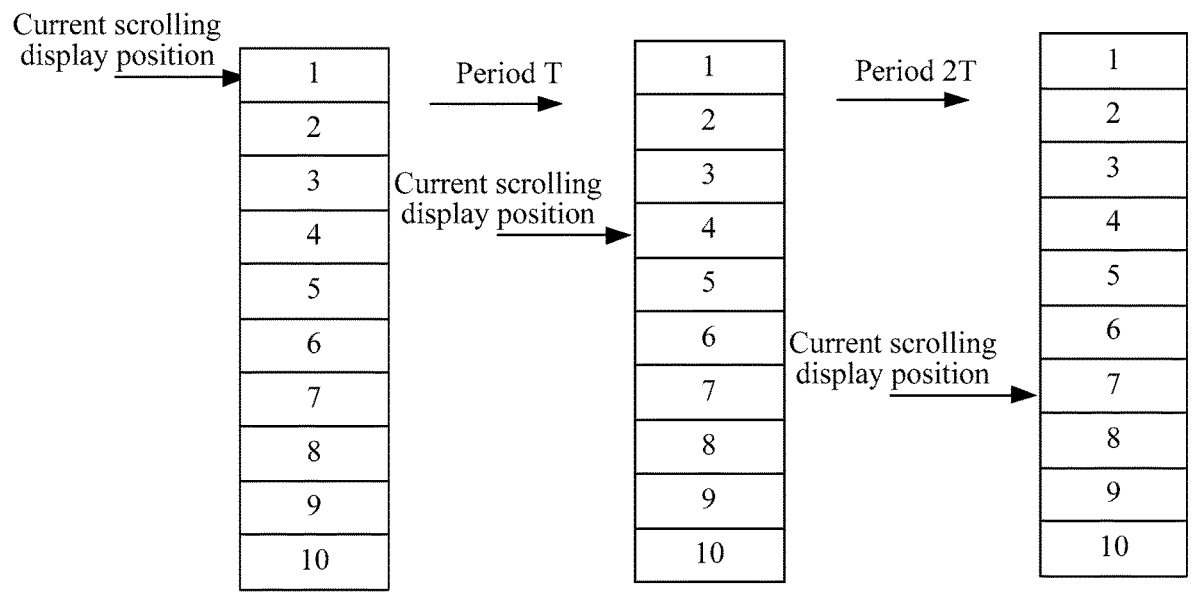
FIG. 3 is a schematic diagram of a current retrieval position in an information pushing method according to some embodiments of the present disclosure.

Description is made with reference to FIG. 3. Assuming that the information list includes 10 pieces of information in total, cyclic carousel is performed on the 10 pieces of information at the position, a predetermined interval for movement is 3 pieces of information, and 3 pieces of information are read at one time. For example, the current retrieval position indicates the first piece of information, and an interval period is T. After 3 pieces of information are moved, the current retrieval position indicates the fourth piece of information, the fourth piece of information, the fifth piece of information, and the sixth piece of information are read. After another interval period T, the current retrieval position indicates the seventh piece of information, the seventh piece of information, the eighth piece of information, and the ninth piece of information are read. That is, different information is respectively pushed to the client at different times. By means of flexibly changing the pushed information, the client may flexibly display information, so as to meet requirements of users for browsing different information.

By means of this embodiment provided in this application, after an information retrieving request sent by a client is received, multiple pieces of information are read by starting from a current retrieval position in an information list, and the multiple pieces of read information is pushed to the client. The information in the information list and the current retrieval position are updated periodically, and an updating period of the information list is greater than an updating period of the current retrieval position. Therefore, before the multiple pieces of information for displaying is pushed to the client, information on different positions in different information lists are read by traversing, so as to push different information to the client, thereby improving a flexibility effect of pushing information to the client, avoiding always pushing information with relatively fixed content to the client, and resolving a problem of bad user experience due to that the client cannot flexibly display the information. Further, by means of continuously changing the information that is pushed to the client and that is used for displaying, different users may obtain corresponding information therefrom, thereby meeting browsing requirements of different users, and improving information pushing correctness.

In some embodiments, the retrieving, from the information list, multiple pieces of information starting from the current retrieval position in a cyclic manner includes:

S1: Obtain a currently updated information list and a currently updated current retrieval position in response to the information retrieving request; and S2: Start reading the multiple pieces of information from the currently updated current retrieval position in the currently updated information list.

In some embodiments, the foregoing information list and the current retrieval position are updated according to different periods. The N pieces of information in the foregoing information list may be, but is not limited to, the first N pieces of information that is sequentially arranged and that is obtained from the dynamic information list according to the first time period. The foregoing current retrieval position may, but is not limited to, move by a same predetermined interval every other second time period.

Figure 4:
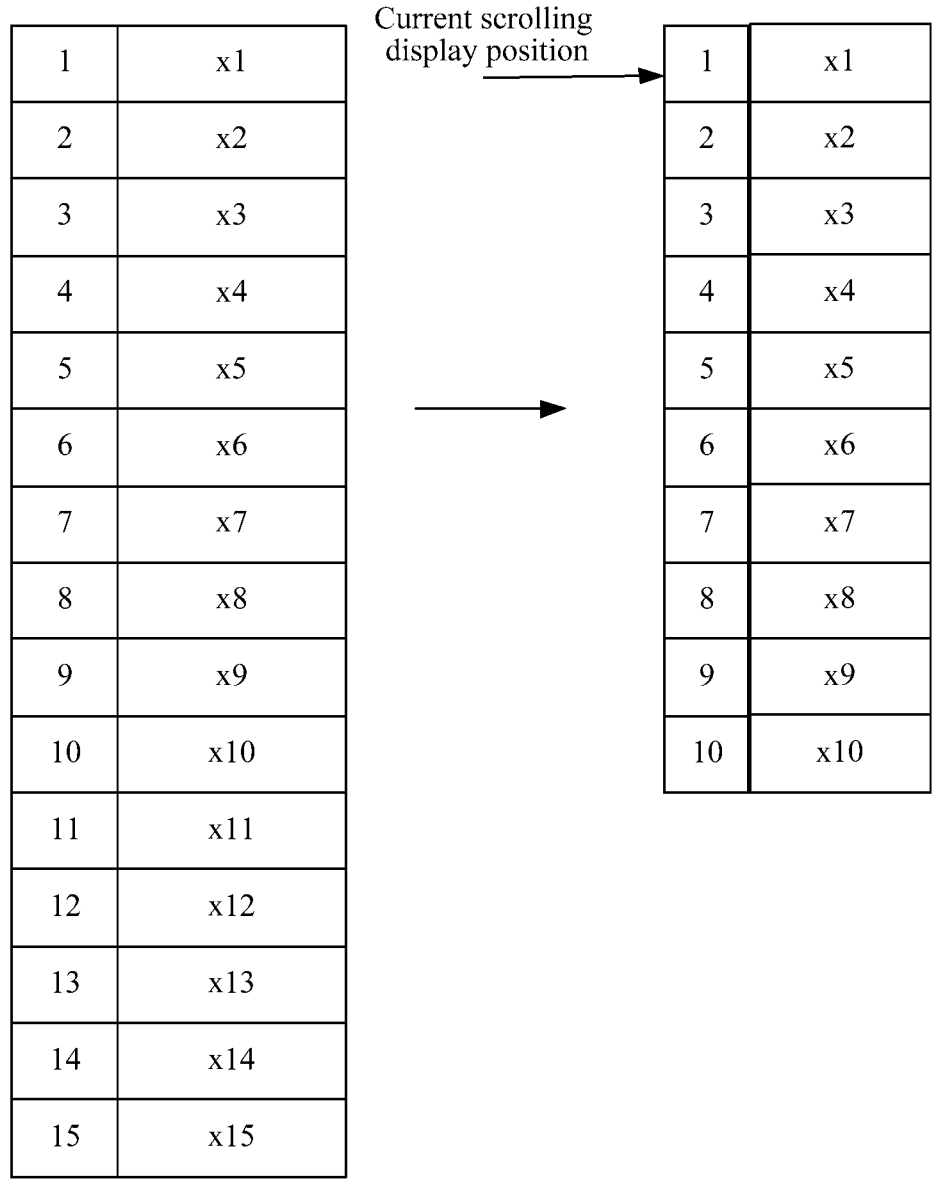
FIG. 4 is a schematic diagram of an information list of an information pushing method according to some embodiments of the present disclosure.
Figure 5:
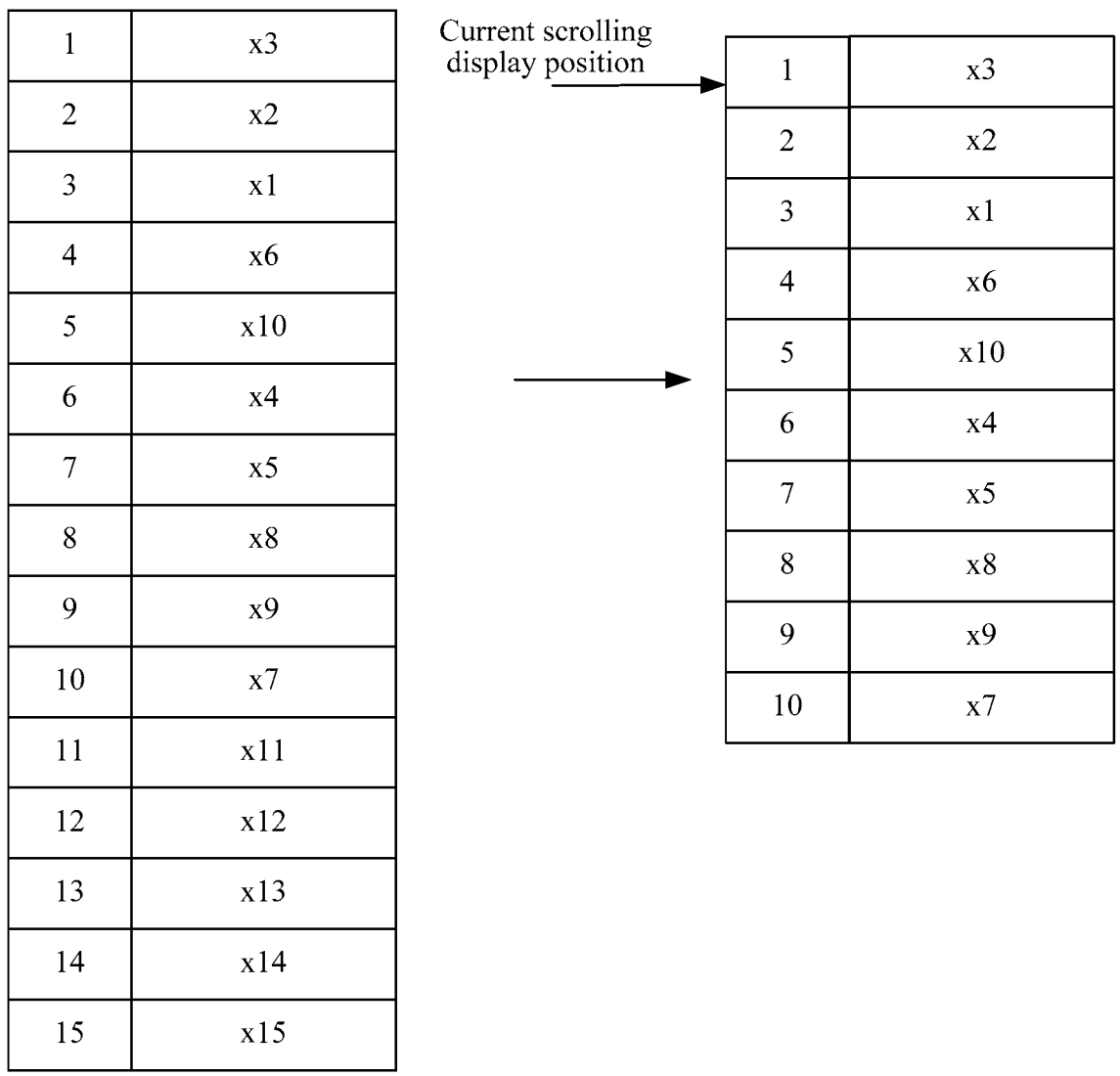
FIG. 5 is a schematic diagram of an information list of another information pushing method according to some embodiments of the present disclosure.

Details are described with reference to the following examples. The left part in FIG. 4 shows a dynamic information list at a moment T1, including 15 pieces of information. The right part of FIG. 4 shows an information list obtained at the moment T1 from the dynamic information list on the left, including first 10 pieces of information. Arrangement positions of information in the information list are that: information x1 is located at the first piece of information, information x2 is located at the second piece of information, information x3 is located at the third piece of information, and arrangement positions of other information are deduced like this as shown in FIG. 4. FIG. 5 shows a dynamic information list at a moment T2 after the moment T1 and a corresponding information list. Specifically, the left part of FIG. 5 shows the dynamic information list at the moment T2, including 15 pieces of information, and the right part of FIG. 5 shoes the information list obtained at the moment T2 from the dynamic information list on the left, including first 10 pieces of information. Arrangement positions of information in the information list are that: information x3 is located at the first piece of information, information x2 is located at the second piece of information, information x1 is located at the third piece of information, and arrangement positions of other information are deduced like this as shown in FIG. 5. This is merely an example, and this embodiment is not limited thereto.

That is, information lists obtained at different moments change along with dynamic information list that changes in real time. The information list is periodically updated according to the first time period, so as to push information that is updated in real time to a client, thereby ensuring that a user browses the newest information.

It should be noted that in this embodiment, the N pieces of information in the information list may be some information in the dynamic information list. That is, a quantity of information in the dynamic information list is greater than N. As shown in the foregoing example, the dynamic information list includes 15 pieces of information, and the information list includes 10 pieces of information. In addition, the N pieces of information in the information list may be all the information in the dynamic information list, that is, the dynamic information list also includes N pieces of information.

In some embodiments, updating of the foregoing current retrieval position is as shown in FIG. 3. Please refer to the foregoing description for details. Details are not described herein again in this embodiment.

By means of this embodiment provided in this application, information is read from an obtained updated information list, so that information that changes in real time is pushed to a client, so as to ensure that a user browses the newest information. In addition, by means of starting reading multiple pieces of information from an updated current retrieval position, a problem of leaking other relatively important information due to that only relatively fixed information can be pushed in a relevant technology is resolved, so as to improve flexibility of pushing information to the client, and ensure that the client may changeably display to-be-displayed information. Further, information is sequentially read according to the continuously updated current retrieval position, avoiding repeatedly displaying information browsed by the user, so as to improve user experience.

In some embodiments, the information list includes N pieces of information, and before the retrieving, from the information list, multiple pieces of information starting from the current retrieval position in a cyclic manner, the method further includes:

S1: Replace, according to the first time period, the N pieces of information in the information list by first N pieces of information sequentially arranged in a currently obtained dynamic information list, to obtain the currently updated information list, information in the dynamic information list changing in real time.

Details are described with reference to FIG. 4 and FIG. 5. Assuming that the moment T1 shown in FIG. 4 is 10:00 and the first time period is 5 minutes, the moment T2 shown in FIG. 5 is 10:05, the dynamic information list is a hot topic information ranking list, and the hot topic information ranking list changes in real time. The information list includes the first 10 pieces of hot topic information ranking in the hot topic information ranking list. Specifically, the information list shown on the right of FIG. 4 is obtained at 10:00 from the hot topic information ranking list, so that multiple pieces (for example, 3 pieces) of hot topic information is read by starting at the current retrieval position from the information list, and the hot topic information is pushed to the client for displaying. Further, 5 minutes later, the hot topic information ranking list is updated at 10:05 into the list shown in the left of FIG. 5. Therefore, 10 pieces of information in the information list at 10:05 is replaced by the first 10 pieces of hot topic information in the updated hot topic information ranking list at 10:05, as shown in the right of FIG. 5, to obtain a currently updated information list.

By means of this embodiment provided in this application, N pieces of information in an information list is replaced according to the first time period by the first N pieces of information arranged sequentially in a currently obtained dynamic information list, to obtain a currently updated information list so as to update in real time, by updating the information list in real time, information pushed to a client, so as to further ensure that a user may browse newest information that is updated in time at the client.

In some embodiments, before the retrieving, from the information list, multiple pieces of information starting from the current retrieval position in a cyclic manner, the method further includes:

S1: Move the current retrieval position by a same predetermined interval every other second time period to obtain the currently updated current retrieval position.

Details are described with reference to FIG. 3. Assuming that the second time period is 1 minute, and the first time period is 5 minutes. That is, after an updated information list is obtained, for the current retrieval position, information may be started to be read respectively from 5 positions. Specifically, as shown in FIG. 3, a predetermined interval for moving the current retrieval position is 3 pieces of information, and 3 pieces of information are read at one time. That is, when an initial position of the current retrieval position indicates the first piece of information at 10:00, start reading the first piece of information, the second piece of information, and the third piece of information. When the current retrieval position indicates the fourth piece of information at 10:01, start reading the fourth piece of information, the fifth piece of information, and the sixth piece of information. When the current retrieval position indicates the seventh piece of information at 10:02, start reading the seventh piece of information, the eighth piece of information, and the ninth piece of information. When the current retrieval position indicates the tenth piece of information at 10:04, start reading the tenth piece of information, the first piece of information, and the second piece of information. When the current retrieval position indicates the third piece of information at 10:05, start reading the third piece of information, the fourth piece of information, and the fifth piece of information. Further, because an updating period of the information list is reached at 10:05, the information list is updated after 10:05, and for the current retrieval position, carousel is restarted in the updated information list so as to read updated information.

By means of this embodiment provided in this application, a current retrieval position is moved by a same interval every other second time period, to change information pushed to a client, so as to resolve a problem of leaking other relatively important information due to that only relatively fixed information can be pushed in a relevant technology, thereby improving flexibility of pushing information to the client and ensuring that the client may changeably display to-be-displayed information. Further, information is sequentially read according to the continuously updated current retrieval position, avoiding repeatedly displaying information browsed by the user, so as to improve user experience.

In some embodiments, an initial position of the current retrieval position P is the $i^{th}$ piece of information in the information list, the information list includes N pieces of information, and the moving the current retrieval position of the information list by a predefined interval in the cyclic manner according to a second time period includes:

$$P=(i+m*S)\%N \quad (1),$$

N representing the second time period, m representing that the $m^{th}$ second time period is currently reached, S representing the predetermined interval, and % being a modulo operation.

In some embodiments, a moving predetermined interval of the current retrieval position is greater than or equal to a quantity of multiple pieces of information read starting from the current retrieval position at one time. Assuming that the multiple pieces of information are Q pieces of information, and a predetermined interval is S pieces of information, S is greater than or equal to Q.

Details are described with reference to the following examples. As shown in FIG. 3, the information list includes 10 pieces of information. When a moving predetermined interval of the current retrieval position is 3 pieces of information, 3 pieces of information are read at one time. The initial position of the current retrieval position P is the first piece of information. For example, when the first second time period is reached currently, the current retrieval position P=(1+1*3)%10=4, that is, 3 pieces of information are started to be read from the fourth piece of information, and the 3 pieces of information are respectively the fourth piece of information, the fifth piece of information, and the sixth piece of information.

For another example, when the fourth second time period is currently reached, the current retrieval position changes to the fifth position. Specifically, the current retrieval position P=(1+4*3)%10=3, that is, 3 pieces of information are started to be read from the third piece of information, and the 3 pieces of information are respectively the third piece of information, the fourth piece of information, and the fifth piece of information.

It should be noted that in this embodiment, because there is an initial position when the current retrieval position starts reading from the information list, when the $m^{th}$ period is reached, the current retrieval position changes to the $(m+1)^{th}$ position.

By means of this embodiment provided in this application, the current retrieval position is enabled, by using the method, to move according to a predetermined interval so as to obtain a currently updated current retrieval position, thereby implementing traversing of the information list, so as to avoid leaking other relatively important information in the information list, and further facilitate pushing information that better meets a user browsing requirement to a user.

In some embodiments, a position of information in the information list is determined according to a quantity of operation times of operations performed by the user on the information.

In some embodiments, a position of information in the information list is determined by using the following methods:

S1: Obtain the quantity of operation times of different operations performed by the user on the information; and S2: Determine the position of the information in the information list according to a weighted average of the quantity of operation times of different operations.

In some embodiments, weighted calculation is performed by using a publishing time of information, a quantity of likes, a quantity of replies, a quantity of bumping, and an identity of bumping users, so as to obtain a weighted average of the information, for example, "popularity". Further, sequential arrangement is performed on the information in real time according to the weighted average, so as to obtain a dynamic information list.

It should be noted that, for ease of description, the foregoing method embodiments are described as a series of action combinations. However, a person skilled in the art should understand that the present disclosure is not limited to the described sequence of the actions, because some operations may be performed in another sequence or performed at the same time according to the present disclosure. In addition, a person skilled in the art should also understand that the embodiments described in this specification all belong to exemplary embodiments, and the involved actions and modules are not necessarily mandatory to the present disclosure.

Based on the foregoing descriptions of the implementation manners, a person skilled in the art may clearly understand that the method according to the embodiments may be implemented by software in addition to a necessary universal hardware platform or by hardware only. In most circumstances, the former is an exemplary implementation manner. Based on such an understanding, the technical solutions of the present disclosure essentially or the part contributing to the prior art may be implemented in a form of a software product. The computer software product is stored in a storage medium (such as an ROM/RAM, a magnetic disk, or an optical disc), and includes several instructions for instructing a terminal device (which may be a mobile phone, a computer, a server, or a network device) to perform the methods described in the embodiments of the present disclosure.

According to this embodiment of the present disclosure, an information pushing apparatus used for implementing the information pushing method is provided. An application environment of this embodiment is the same as that of other embodiments, and details are not described herein again in this embodiment.

Figures 6, 7:
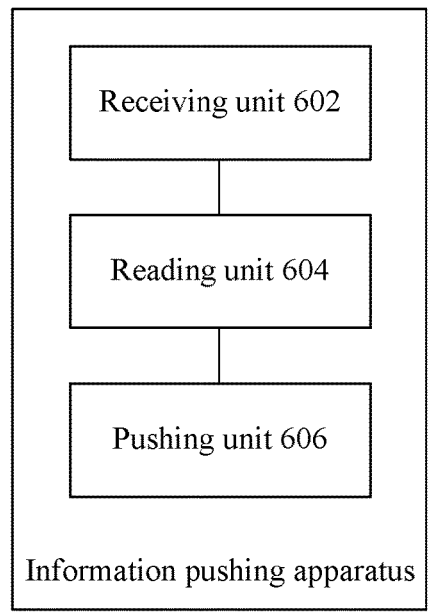
FIG. 6 is a flowchart of an information pushing apparatus according to some embodiments of the present disclosure.
FIG. 7 is an exemplary schematic diagram of an information pushing method according to some embodiments of the present disclosure.

In this embodiment of the present disclosure, as shown in FIG. 6, the apparatus includes:

1) a receiving unit 602, configured to receive an information retrieving request sent by a client;

2) a reading unit 604, configured to start reading multiple pieces of information from a current retrieval position in an information list in response to the information retrieving request, the information list updated according to a first time period, the current retrieval position updated according to a second time period, and the first time period being longer than the second time period; and 3) a pushing unit 606, configured to push the multiple pieces of information to the client.

In some embodiments, the information pushing apparatus may be applied to, but is not limited to, a process of presenting hot topic information. Specifically, after receiving the information retrieving request that is sent by the client and that is used for reading the hot topic information, the server starts reading multiple pieces of the hot topic information from the current retrieval position recorded in the information list, and further send the multiple pieces of hot topic information to the client for presentation. The hot topic information in the information list updates once according to the first time period, and the current retrieval position updates every other second time period, the first time period being longer than the second time period. This is merely an example, and this embodiment is not limited thereto.

It should be noted that in this embodiment, the hot topic information in the information list and the current retrieval position are periodically updated. Therefore, before information is pushed to the client, the hot topic information on different positions in different information lists are read, so as to improve flexibility for pushing information to the client, avoiding bad user experience due to that information with relatively fixed content is always pushed to the client, and the client cannot flexibly display the information.

In some embodiments, for the information list, information is sequentially obtained from a dynamic information list, and the dynamic information list changes in real time.

For example, the dynamic information list is a hot information ranking list, and ranks of hot information changes in real time. Therefore, the hot information ranking list also changes in real time. The currently obtained hot information in the hot information ranking list is used as an information snapshot (that is, the information list), and is recorded and stored. Carousel positions updating according to a predetermined period are set in the information snapshot so as to push different hot information in the information snapshot to the client according to indications of different positions, so as to flexibly push to-be-displayed hot information to the client.

In some embodiments, the foregoing information list may be, but is not limited to, a part of or all of the dynamic information list. That is, the information list may be the first N pieces of information in the currently obtained dynamic information list. For example, the first ten pieces of hot information is currently obtained from the hot information ranking list that dynamically changes in real time, and positions are set in an information list composed of the first ten pieces of hot information.

In some embodiments, a position of the information in the information list is determined according to a quantity of operation times of operations performed by the user on the information. In some embodiments, a position of the information in the information list is determined by using the following methods:

S1: Obtain the quantity of operation times of different operations performed by the user on the information; and S2: Determine the position of the information in the information list according to a weighted average of the quantity of operation times of different operations.

In some embodiments, the foregoing operations may include, but is not limited to, at least one of the following: liking, replying, or bumping.

In some embodiments, the current retrieval position may be, but is not limited to, obtained by moving by a same predetermined interval every other second time period.

It should be noted that the information list is an ordered sequence. The multiple pieces of information read by starting from the current retrieval position in the information list may be, but is not limited to, the multiple pieces of information by using information indicated by the current retrieval position as a starting point.

Description is made with reference to FIG. 3. Assuming that the information list includes 10 pieces of information in total, cyclic carousel is performed on the 10 pieces of information at the position, a predetermined interval for movement is 3 pieces of information, and 3 pieces of information are read at one time. For example, the current retrieval position indicates the first piece of information, and an interval period is T. After three pieces of information are moved, the current retrieval position indicates the fourth piece of information, the fourth piece of information, the fifth piece of information, and the sixth piece of information are read. After another interval period T, the current retrieval position indicates the seventh piece of information, the seventh piece of information, the eighth piece of information, and the ninth piece of information are read. That is, different information is respectively pushed to the client at different times. By means of flexibly changing the pushed information, the client may flexibly display information, so as to meet requirements of users for browsing different information.

By means of this embodiment provided in this application, after an information retrieving request sent by a client is received, multiple pieces of information are read by starting from a current retrieval position in an information list, and the multiple pieces of read information is pushed to the client. The information in the information list and the current retrieval position are updated periodically, and an updating period of the information list is greater than an updating period of the current retrieval position. Therefore, before the multiple pieces of information for displaying is pushed to the client, information on different positions in different information lists are read by traversing, so as to push different information to the client, thereby improving a flexibility effect of pushing information to the client, avoiding always pushing information with relatively fixed content to the client, and resolving a problem of bad user experience due to that the client cannot flexibly display the information. Further, by means of continuously changing the information that is pushed to the client and that is used for displaying, different users may obtain corresponding information therefrom, thereby meeting browsing requirements of different users, and improving information pushing correctness.

In some embodiments, the reading unit 604 includes:

1) an obtaining module, configured to obtain a currently updated information list and a currently updated current retrieval position in response to the information retrieving request; and 2) a reading module, configured to start reading the multiple pieces of information from the currently updated current retrieval position in the currently updated information list.

In some embodiments, the foregoing information list and the current retrieval position are updated according to different periods. The N pieces of information in the foregoing information list may be, but is not limited to, the first N pieces of information that is sequentially arranged and that is obtained from the dynamic information list according to the first time period. The foregoing current retrieval position may, but is not limited to, move by a same predetermined interval every other second time period.

Details are described with reference to the following examples. The left part in FIG. 4 shows a dynamic information list at a moment T1, including 15 pieces of information. The right part of FIG. 4 shows an information list obtained at the moment T1 from the dynamic information list on the left, including first 10 pieces of information. Arrangement positions of information in the information list are that: information x1 is located at the first piece of information, information x2 is located at the second piece of information, information x3 is located at the third piece of information, and arrangement positions of other information are deduced like this as shown in FIG. 4. FIG. 5 shows a dynamic information list at a moment T2 after the moment T1 and a corresponding information list. Specifically, the left part of FIG. 5 shows the dynamic information list at the moment T2, including 15 pieces of information, and the right part of FIG. 5 shoes the information list obtained at the moment T2 from the dynamic information list on the left, including first 10 pieces of information. Arrangement positions of information in the information list are that: information x3 is located at the first piece of information, information x2 is located at the second piece of information, information x1 is located at the third piece of information, and arrangement positions of other information are deduced like this as shown in FIG. 5. This is merely an example, and this embodiment is not limited thereto.

That is, information lists obtained at different moments change along with dynamic information list that changes in real time. The information list is periodically updated according to the first time period, so as to push information that is updated in real time to a client, thereby ensuring that a user browses the newest information.

It should be noted that in this embodiment, the N pieces of information in the information list may be some information in the dynamic information list. That is, a quantity of information in the dynamic information list is greater than N. As shown in the foregoing example, the dynamic information list includes 15 pieces of information, and the information list includes 10 pieces of information. In addition, the N pieces of information in the information list may be all the information in the dynamic information list, that is, the dynamic information list also includes N pieces of information.

In some embodiments, updating of the foregoing current retrieval position is as shown in FIG. 3. Please refer to the foregoing description for details. Details are not described herein again in this embodiment.

By means of this embodiment provided in this application, information is read from an obtained updated information list, so that information that changes in real time is pushed to a client, so as to ensure that a user browses the newest information. In addition, by means of starting reading multiple pieces of information from an updated current retrieval position, a problem of leaking other relatively important information due to that only relatively fixed information can be pushed in a relevant technology is resolved, so as to improve flexibility of pushing information to the client, and ensure that the client may changeably display to-be-displayed information. Further, information is sequentially read according to the continuously updated current retrieval position, avoiding repeatedly displaying information browsed by the user, so as to improve user experience.

In some embodiments, the information list includes N pieces of information, and the apparatus further includes:

1) a replacement unit, configured to replace, according to the first time period before starting reading the multiple pieces of information from the current retrieval position in the information list in response to the information retrieving request, the N pieces of information in the information list by first N pieces of information sequentially arranged in a currently obtained dynamic information list, to obtain the currently updated information list, information in the dynamic information list changing in real time.

Details are described with reference to FIG. 4 and FIG. 5. Assuming that the moment T1 shown in FIG. 4 is 10:00 and the first time period is 5 minutes, the moment T2 shown in FIG. 5 is 10:05, the dynamic information list is a hot topic information ranking list, and the hot topic information ranking list changes in real time. The information list includes the first 10 pieces of hot topic information ranking in the hot topic information ranking list. Specifically, the information list shown on the right of FIG. 4 is obtained at 10:00 from the hot topic information ranking list, so that multiple pieces (for example, 3 pieces) of hot topic information is read by starting at the current retrieval position from the information list, and the hot topic information is pushed to the client for displaying. Further, 5 minutes later, the hot topic information ranking list is updated at 10:05 into the list shown in the left of FIG. 5. Therefore, 10 pieces of information in the information list at 10:05 is replaced by the first 10 pieces of hot topic information in the updated hot topic information ranking list at 10:05, as shown in the right of FIG. 5, to obtain a currently updated information list.

By means of this embodiment provided in this application, N pieces of information in an information list is replaced according to the first time period by the first N pieces of information arranged sequentially in a currently obtained dynamic information list, to obtain a currently updated information list so as to update in real time, by updating the information list in real time, information pushed to a client, so as to further ensure that a user may browse newest information that is updated in time at the client.

In some embodiments, the apparatus further includes:

1) a movement unit, configured to move, before starting reading the multiple pieces of information from the current retrieval position in the information list in response to the information retrieving request, the current retrieval position by a same predetermined interval every other second time period to obtain the currently updated current retrieval position.

Details are described with reference to FIG. 3. Assuming that the second time period is 1 minute, and the first time period is 5 minutes. That is, after an updated information list is obtained, for the current retrieval position, information may be started to be read respectively from 5 positions. Specifically, as shown in FIG. 3, a predetermined interval for moving the current retrieval position is 3 pieces of information, and 3 pieces of information are read at one time. That is, when an initial position of the current retrieval position indicates the first piece of information at 10:00, start reading the first piece of information, the second piece of information, and the third piece of information. When the current retrieval position indicates the fourth piece of information at 10:01, start reading the fourth piece of information, the fifth piece of information, and the sixth piece of information. When the current retrieval position indicates the seventh piece of information at 10:02, start reading the seventh piece of information, the eighth piece of information, and the ninth piece of information. When the current retrieval position indicates the tenth piece of information at 10:04, start reading the tenth piece of information, the first piece of information, and the second piece of information. When the current retrieval position indicates the third piece of information at 10:05, start reading the third piece of information, the fourth piece of information, and the fifth piece of information. Further, because an updating period of the information list is reached at 10:05, the information list is updated after 10:05, and for the current retrieval position, carousel is restarted in the updated information list so as to read updated information.

By means of this embodiment provided in this application, a current retrieval position is moved by a same interval every other second time period, to change information pushed to a client, so as to resolve a problem of leaking other relatively important information due to that only relatively fixed information can be pushed in a relevant technology, thereby improving flexibility of pushing information to the client and ensuring that the client may changeably display to-be-displayed information. Further, information is sequentially read according to the continuously updated current retrieval position, avoiding repeatedly displaying information browsed by the user, so as to improve user experience.

In some embodiments, an initial position of the current retrieval position P is the $i^{th}$ piece of information in the information list, the information list includes N pieces of information, and the movement unit obtains the currently updated current retrieval position by using the following calculation formula:

$$P=(i+m*S)\%N \quad (2),$$

T representing the second time period, m representing that the $m^{th}$ second time period is currently reached, S representing the predetermined interval, and % being a modulo operation.

In some embodiments, a moving predetermined interval of the current retrieval position is greater than or equal to a quantity of multiple pieces of information read starting from the current retrieval position at one time. Assuming that the multiple pieces of information are Q pieces of information, and a predetermined interval is S pieces of information, S is greater than or equal to Q.

Details are described with reference to the following examples. As shown in FIG. 3, the information list includes 10 pieces of information. When a moving predetermined interval of the current retrieval position is 3 pieces of information, 3 pieces of information are read at one time. The initial position of the current retrieval position P is the first piece of information. For example, when the first second time period is reached currently, the current retrieval position P=(1+1*3)%10=4, that is, 3 pieces of information are started to be read from the fourth piece of information, and the 3 pieces of information are respectively the fourth piece of information, the fifth piece of information, and the sixth piece of information.

For another example, when the fourth second time period is currently reached, the current retrieval position changes to the fifth position. Specifically, the current retrieval position P=(1+4*3)%10=3, that is, 3 pieces of information are started to be read from the third piece of information, and the 3 pieces of information are respectively the third piece of information, the fourth piece of information, and the fifth piece of information.

It should be noted that in this embodiment, because there is an initial position when the current retrieval position starts reading from the information list, when the $m^{th}$ period is reached, the current retrieval position changes to the $(m+1)^{th}$ position.

By means of this embodiment provided in this application, the current retrieval position is enabled, by using the method, to move according to a predetermined interval so as to obtain a currently updated current retrieval position, thereby implementing traversing of the information list, so as to avoid leaking other relatively important information in the information list, and further facilitate pushing information that better meets a user browsing requirement to a user.

In some embodiments, the apparatus further includes:
1) an obtaining unit, configured to obtain the quantity of operation times of different operations performed by the user on the information; and
2) a determining unit, configured to determine the position of the information in the information list according to a weighted average of the quantity of operation times of different operations.

In some embodiments, weighted calculation is performed by using a publishing time of information, a quantity of likes, a quantity of replies, a quantity of bumping, and an identity of bumping users, so as to obtain a weighted average of the information, for example, "popularity". Further, sequential arrangement is performed on the information in real time according to the weighted average, so as to obtain a dynamic information list.

An information pushing method is described in this embodiment by using an example of displaying a hottest post. It should be noted that information and a client on a mobile phone for displaying the information are merely examples in this embodiment, and this embodiment is not limited thereto. This embodiment may be further applied to other terminals such as a tablet computer, a notebook computer, or a PC computer, and is applicable to other applications running on other terminals.

In some embodiments, application scenarios in this embodiment may refer to content described in the foregoing embodiments, and details are not described herein again in this embodiment.

Figure 8:
FIG. 8 is a schematic diagram of a client of an information pushing method according to some embodiments of the present disclosure.

Details are described with reference to the following examples. Assuming that topic information is # posting your sunniest smile #, including hot posts created by multiple users (for example, 10 users) about the topic information. Ranking of the hot posts changes in real time. The left side of FIG. 7 shows a current dynamic hot post list, which is hot post information arranged according to popularity. The dynamic hot post list includes information about a user that creates a hot post, and the hot post that is created by the user and that is about the topic information may be pushed to a client according to the user information. The right side of FIG. 7 shows a hot post list obtained from the current dynamic hot post list, that is, the hot posts that are created by the first 5 users and that are about the topic information. Assuming that a current retrieval position indicates a hot post created by the third user, and 3 hot posts are read at one time, reading is started from the hot post created by the third user indicated by the current retrieval position, and the three hot posts that are read are pushed to the client for displaying. The client on a terminal may display the hot posts as shown in FIG. 8, that is, display hot posts that are created by the third to the fifth users.

Figure 9:
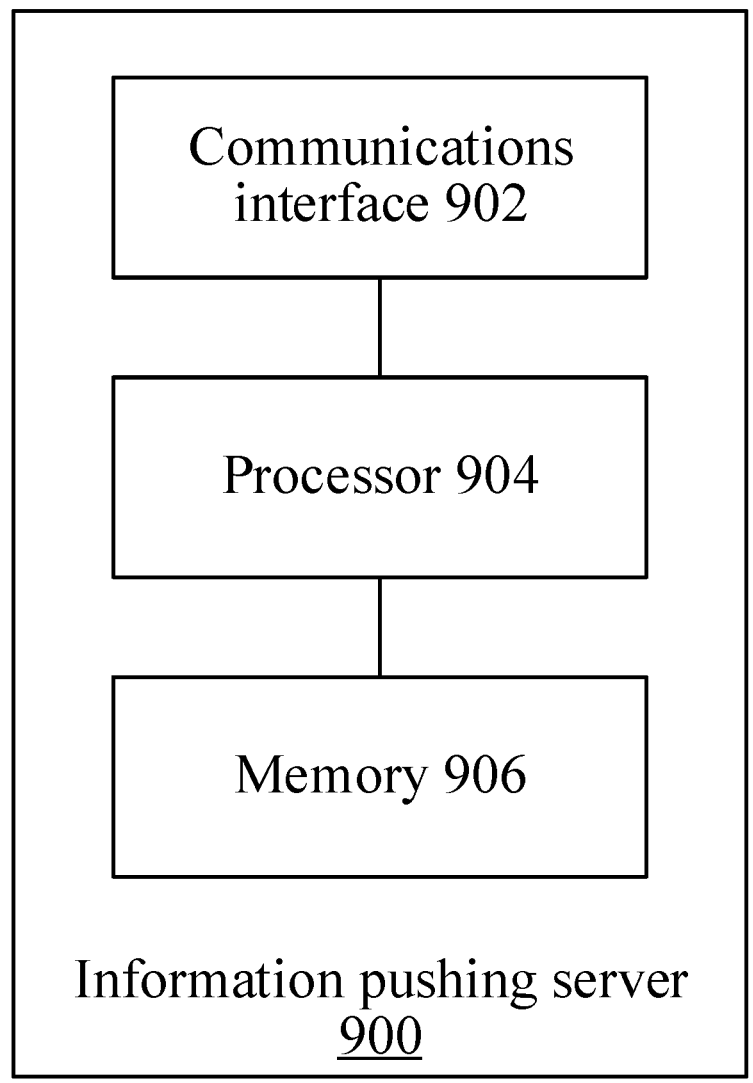
FIG. 9 is a schematic diagram of an information pushing server according to some embodiments of the present disclosure.

According to this embodiment of the present disclosure, an information pushing server 900 used for implementing the foregoing information pushing method is further provided. As shown in FIG. 9, the server includes:

1) a communications interface 902, configured to receive an information retrieving request sent by a client, and push multiple pieces of information to the client;

2) a processor 904, connected to the communications interface 902 and configured to start reading multiple pieces of information from a current retrieval position in an information list, the information list updated according to a first time period, the current retrieval position updated according to a second time period, and the first time period being longer than the second time period; and 3) a memory 906, connected to the processor 904 and configured to store information in the information list and the current retrieval position.

In some embodiments, specific examples in this embodiment may refer to examples described in the foregoing embodiments, and details are not described herein again in this embodiment.

An embodiment of the present disclosure further provides a storage medium used for implementing the information pushing method.

In some embodiments, the storage medium is set to store program code used for executing the following operations:

S1: Receive an information retrieving request sent by a client;

S2: Start reading multiple pieces of information from a current retrieval position in an information list in response to the information retrieving request, the information list updated according to a first time period, the current retrieval position updated according to a second time period, and the first time period being longer than the second time period; and S3: Push the multiple pieces of information to the client.

In some embodiments, the storage medium is set to store program code used for executing the following operation: obtaining a currently updated information list and a currently updated current retrieval position in response to the information retrieving request; and starting reading the multiple pieces of information from the currently updated current retrieval position in the currently updated information list.

In some embodiments, the information list includes N pieces of information, and the storage medium is further set to store program code used for executing the following operation: replacing, according to the first time period before starting reading the multiple pieces of information from the current retrieval position in the information list in response to the information retrieving request, the N pieces of information in the information list by first N pieces of information sequentially arranged in a currently obtained dynamic information list, to obtain the currently updated information list, information in the dynamic information list changing in real time.

The storage medium is further set to store program code used for executing the following operation.

In some embodiments, the storage medium is further set to store program code used for executing the following operation: moving, before starting reading the multiple pieces of information from the current retrieval position in the information list in response to the information retrieving request, the current retrieval position by a same predetermined interval every other second time period to obtain the currently updated current retrieval position.

In some embodiments, the foregoing storage medium includes but is not limited to: any medium that can store program code, such as a USB flash drive, a read-only memory (ROM, Read-Only Memory), a random access memory (RAM, Random Access Memory), a removable hard disk, a magnetic disk, or an optical disc.

In some embodiments, specific examples in this embodiment may refer to examples described in the foregoing embodiments, and details are not described herein again in this embodiment.

Figure 10:
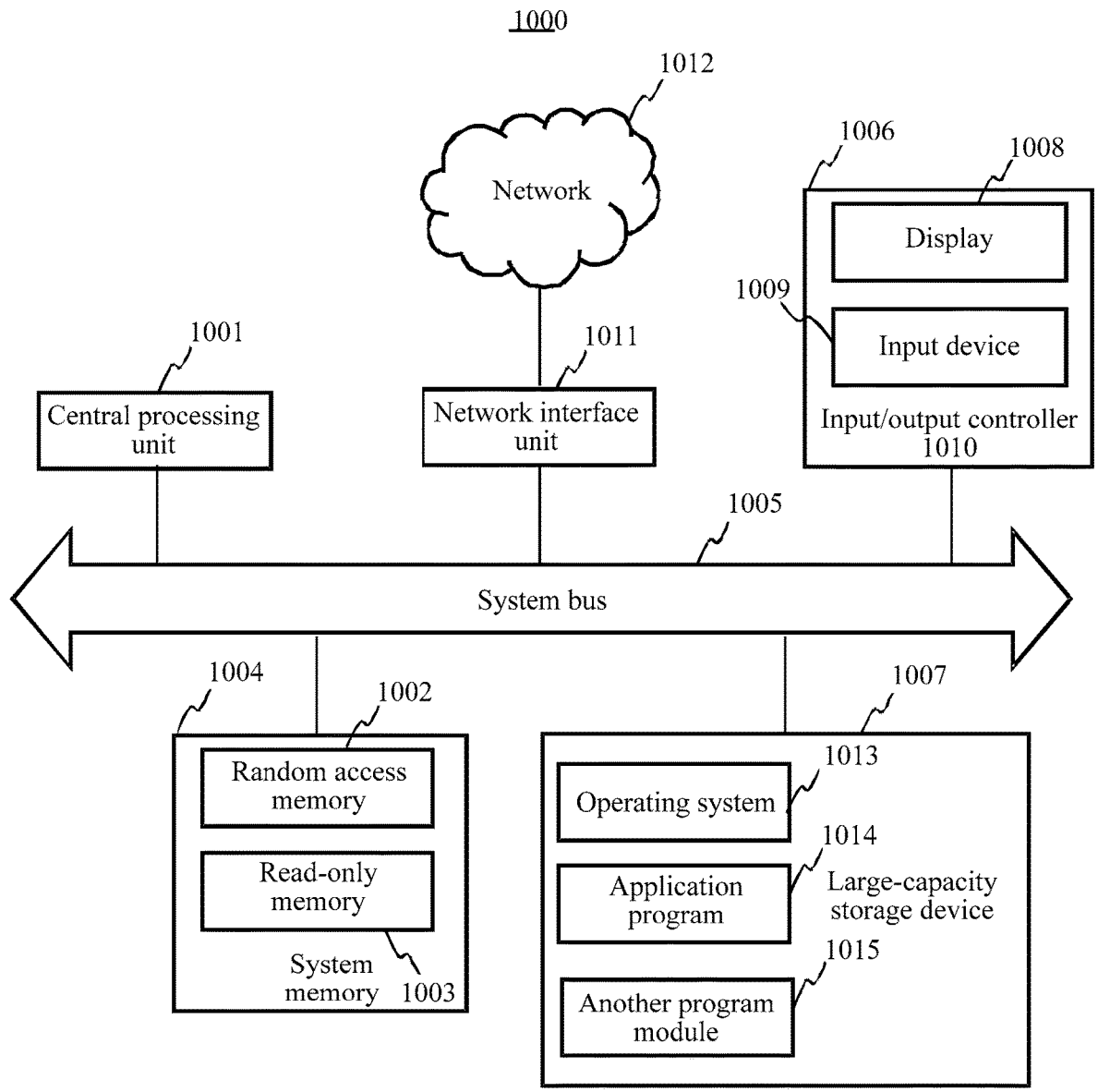
FIG. 10 is a schematic structural diagram of a server according to some embodiments of the present disclosure.

FIG. 10 is a schematic structural diagram of a server according to some embodiments of the present disclosure. In some embodiments, the server 1000 may be an information pushing server 900.

The server 1000 includes one or more processors (e.g., CPU) 1001, system memory 1004 including RAM 1002 and ROM 1003, and a system bus 1005 connecting the system memory 1004 and the CPU 1001. The server 1000 further includes a basic input/output (I/O) system 1006 helping devices in a computer to transmit information, and a large-capacity storage device 1007 that is configured to store an operating system 1013, one or more application programs 1014, and other program modules 1015.

The basic input/output system 1006 includes a display 1008 configured to display information and an input device 1009 such as a mouse or a keyboard that is used by a user to input information. The display 1008 and the input device 1009 are both connected to the CPU 1001 by using an I/O controller 1010 connected to the system bus 1005. The basic I/O system 1006 may further include the I/O controller 1010, so as to receive and process input from multiple other devices, such as a keyboard, a mouse, and an electronic stylus. Similarly, the I/O controller 1010 further provides a display, a printer, or another type of output device.

The large-capacity storage device 1007 is connected to the CPU 1001 by using a large-capacity storage controller (not shown) connected to the system bus 1005. The large-capacity storage device 1007 and a computer readable medium relevant to the large-capacity storage device provide non-volatile storage to the server 1000. That is, the large-capacity storage device 1007 may include a non-transitory computer readable medium (not shown), such as a hard disk or a CD-ROM driver.

Without loss of generality, the computer readable medium may include a computer storage medium and a communications medium. The computer storage medium includes volatile and non-volatile, movable and unmovable media implemented by using any method or technology and configured to store information such as a computer readable instruction, a data structure, a program module, or other data. The computer storage medium includes a static RAM (SRAM), an electrically erasable programmable ROM (EEPROM), an erasable programmable ROM (EPROM), a programmable ROM (PROM), an RAM, an ROM, a flash memory or another solid storage technology, and a CD-ROM, a digital versatile disc (DVD), or another optical storage, and a cassette, a tape, magnetic storage, or another magnetic storage device. Certainly, a person skilled in the art may know that the computer storage medium is not limited to the foregoing. The system memory 1004 and the large-capacity storage device 1007 may be uniformly referred to as a memory.

According to various embodiments of the present disclosure, the server 1000 may be connected to a remote computer on a network by using a network such as the Internet. That is, the server 1000 may be connected to a network 1012 by using a network interface unit 1011 connected to the system bus 1005, or the server 1000 may be connected to a network of another type or a remote computer system (not shown) by using a network interface unit 1011.

The memory further includes one or more programs. The one or more programs are configured to be executed by one or more processors, and include instructions used to perform various operations described in the present disclosure. In an exemplary embodiment, a non-temporary computer readable storage medium including instructions is further provided, for example, a memory including instructions. The instructions may be executed by the processor of the information pushing server, to perform the resource deduction method. For example, the non-temporary computer readable storage medium may be a ROM, a RAM, a CD-ROM, a magnetic disk, a floppy disk, or an optical data storage device.

The sequence numbers of the above embodiments of the present disclosure are merely for the convenience of description, and do not imply the preference among the embodiments.

When the integrated units in the foregoing embodiments are implemented in the form of software functional units and sold or used as independent products, the functions may be stored in the foregoing computer-readable storage medium. Based on such an understanding, the technical solutions of the present disclosure essentially or the part contributing to the prior art, or some or all of the technical solutions may be implemented in a form of a software product. The computer software product is stored in a storage medium, and includes several instructions for instructing one or more terminal devices (which may be a personal computer, a server, or a network device) to perform all or some of the operations of the methods described in the embodiments of the present disclosure.

In the foregoing embodiments of the present disclosure, descriptions of embodiments have particular focuses. For a part of an embodiment that is not described in detail, refer to relevant descriptions of other embodiments.

In the several embodiments provided in this application, it should be understood that the disclosed client may be implemented in other manners. The described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electronic or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The foregoing integrated units may be implemented in a form of hardware, or may be implemented in a form of software functional units.

The foregoing descriptions are exemplary implementations of the present disclosure. It should be noted that a person of ordinary skill in the art may make certain improvements and polishing without departing from the principle of the present disclosure and the improvements and polishing shall fall within the protection scope of the present disclosure.

In this embodiment of the present disclosure, after an information retrieving request sent by a client is received, multiple pieces of information are read from a current retrieval position in an information list, and the multiple pieces of read information is pushed to the client. The information in the information list and the current retrieval position are updated periodically, and an updating period of the information list is greater than an updating period of the current retrieval position. Therefore, before the multiple pieces of information for displaying is pushed to the client, information on different positions in different information lists are read by traversing, so as to push different information to the client, thereby improving a flexibility effect of pushing information to the client, avoiding always pushing information with relatively fixed content to the client, and resolving a problem of bad user experience due to that the client cannot flexibly display the information. Further, by means of continuously changing the information that is pushed to the client and that is used for displaying, different users may obtain corresponding information therefrom, thereby meeting browsing requirements of different users, and improving information pushing correctness.

What is claimed is:

1. An information pushing method performed at a computer server having one or more processors and memory storing one or more programs to be executed by the one or more processors, the method comprising:
   receiving an information retrieving request sent by a client;
   in response to the information retrieving request, identifying an information list and a current retrieval position of the information list;
   retrieving, from the information list, multiple pieces of information starting from the current retrieval position in a cyclic manner;
   pushing the multiple pieces of information to the client, wherein the multiple pieces of information is presented at the client in their retrieval order;
   updating the information list according to a first time period;
   updating the current retrieval position of the information list by a predefined interval in the cyclic manner according to a second time period that is shorter than the first time period to $P=(i+m*S) \% N$, wherein an initial position of the current retrieval position P is the ith piece of information in the information list, wherein i represents the $i^{th}$ piece of information in the information list, m represents the $m^{th}$ second time period, S represents the predetermined interval, % is a modulo operation, and N represents the second time period; and
   replacing, according to the first time period, N pieces of information in the information list by first N pieces of information sequentially arranged in a currently obtained dynamic information list, to obtain the currently updated information list, information in the dynamic information list changing in real time.

2. The method according to claim 1, wherein the predefined interval is set to be a random number when the current retrieval position is updated for a first time immediately after the information list is updated and set to be a constant number after the first time.

3. The method according to claim 1, wherein the operation of pushing the multiple pieces of information to the client further comprises:
    after updating the current retrieval position of the information list:
        retrieving, from the information list, multiple pieces of information starting from the updated current retrieval position in the cyclic manner; and
        pushing the multiple pieces of information to the client.

4. The method according to claim 1, wherein the multiple pieces of information are Q pieces of information, and S is greater than or equal to Q.

5. The method according to claim 1, wherein the information retrieving request includes a user account identifier and the current retrieval position is uniquely associated with the user account identifier.

6. A computer server, comprising one or more processors, memory and one or more programs stored in the memory that, when being executed by the one or more processors, cause the computer to perform a plurality of operations including:
    receiving an information retrieving request sent by a client;
    in response to the information retrieving request, identifying an information list and a current retrieval position of the information list;
    retrieving, from the information list, multiple pieces of information starting from the current retrieval position in a cyclic manner;
    pushing the multiple pieces of information to the client, wherein the multiple pieces of information is presented at the client in their retrieval order;
    updating the information list according to a first time period;
    updating the current retrieval position of the information list by a predefined interval in the cyclic manner according to a second time period that is shorter than the first time period to $P=(i+m*S) \% N$, wherein an initial position of the current retrieval position P is the ith piece of information in the information list, wherein i represents the $i^{th}$ piece of information in the information list, m represents the $m^{th}$ second time period, S represents the predetermined interval, % is a modulo operation, and N represents the second time period; and
    replacing, according to the first time period, N pieces of information in the information list by first N pieces of information sequentially arranged in a currently obtained dynamic information list, to obtain the currently updated information list, information in the dynamic information list changing in real time.

7. The computer server according to claim 6, wherein the predefined interval is set to be a random number when the current retrieval position is updated for a first time immediately after the information list is updated and set to be a constant number after the first time.

8. The computer server according to claim 6, wherein the operation of pushing the multiple pieces of information to the client further comprises:
    after updating the current retrieval position of the information list:
        retrieving, from the information list, multiple pieces of information starting from the updated current retrieval position in the cyclic manner; and
        pushing the multiple pieces of information to the client.

9. The computer server according to claim 6, wherein the multiple pieces of information are Q pieces of information, and S is greater than or equal to Q.

10. The computer server according to claim 6, wherein the information retrieving request includes a user account identifier and the current retrieval position is uniquely associated with the user account identifier.

11. A non-transitory computer readable storage medium storing one or more programs that, when executed by one or more processors of a computer server, cause the computer server to perform a plurality of operations including:
    receiving an information retrieving request sent by a client;
    in response to the information retrieving request, identifying an information list and a current retrieval position of the information list;
    retrieving, from the information list, multiple pieces of information starting from the current retrieval position in a cyclic manner;
    pushing the multiple pieces of information to the client, wherein the multiple pieces of information is presented at the client in their retrieval order;
    updating the information list according to a first time period;
    updating the current retrieval position of the information list by a predefined interval in the cyclic manner according to a second time period that is shorter than the first time period to $P=(i+m*S) \% N$, wherein an initial position of the current retrieval position P is the ith piece of information in the information list, wherein i represents the piece of information in the information list, m represents the $m^{th}$ second time period, S represents the predetermined interval, % is a modulo operation, and N represents the second time period; and
    replacing, according to the first time period, N pieces of information in the information list by first N pieces of information sequentially arranged in a currently obtained dynamic information list, to obtain the currently updated information list, information in the dynamic information list changing in real time.

12. The non-transitory computer readable storage medium according to claim 11, wherein the predefined interval is set to be a random number when the current retrieval position is updated for a first time immediately after the information list is updated and set to be a constant number after the first time.

13. The non-transitory computer readable storage medium according to claim 11, wherein the operation of pushing the multiple pieces of information to the client further comprises:
    after updating the current retrieval position of the information list:
        retrieving, from the information list, multiple pieces of information starting from the updated current retrieval position in the cyclic manner; and
        pushing the multiple pieces of information to the client.

14. The non-transitory computer readable storage medium according to claim 11, wherein the multiple pieces of information are Q pieces of information, and S is greater than or equal to Q.

15. The non-transitory computer readable storage medium according to claim 11, wherein the information retrieving request includes a user account identifier and the current retrieval position is uniquely associated with the user account identifier.

\* \* \* \* \*